United States Patent [19]
Pugsley

[11] 3,878,559
[45] Apr. 15, 1975

[54] COLOR SCANNERS FOR IMAGE REPRODUCTION

[75] Inventor: Peter C. Pugsley, Pinner, England

[73] Assignee: Crosfield Electronics Limited, London, England

[22] Filed: Apr. 30, 1973

[21] Appl. No.: 355,672

[30] Foreign Application Priority Data
Apr. 28, 1972 United Kingdom............... 19912/72

[52] U.S. Cl.................. 358/75; 178/6.6 DD; 358/78
[51] Int. Cl.............................................. H04n 1/06
[58] Field of Search...... 178/5.2 A, 6.6 DD; 358/75, 358/78, 80

[56] References Cited

UNITED STATES PATENTS

| | | | |
|---|---|---|---|
| 2,691,696 | 10/1954 | Yule | 178/5.2 A |
| 2,864,886 | 12/1958 | Lemmon | 178/7.1 |
| 3,064,077 | 11/1962 | Cary | 178/6.6 R |
| 3,272,918 | 9/1966 | Koll et al. | 178/6.6 A |
| 3,402,278 | 9/1968 | Dernbach | 178/6.6 B |
| 3,541,245 | 11/1970 | Wilby | 178/6.7 R |
| 3,612,753 | 10/1971 | Korman | 178/5.2 A |
| 3,739,078 | 6/1973 | Pugsley et al. | 178/5.2 A |

*Primary Examiner*—Howard W. Britton
*Assistant Examiner*—Michael A. Masinick
*Attorney, Agent, or Firm*—Kemon, Palmer & Estabrook

[57] ABSTRACT

In making a reproduction of a coloured original, two or more colour separations are prepared in one scanning operation by circumferentially spacing around an output cylinder two or more films to be exposed (or other output surfaces to be treated) to form colour separations, and in each revolution of relative rotation between the cylinder and a reproducing head, the output of the reproducing head is modulated in turn with signals representing one line of each of the two or more separations. Subsequent lines are exposed or treated in subsequent revolutions until the last line of each separation has been scanned.

4 Claims, 3 Drawing Figures

Fig. 1

COLOUR SCANNERS FOR IMAGE REPRODUCTION

Figure 1:
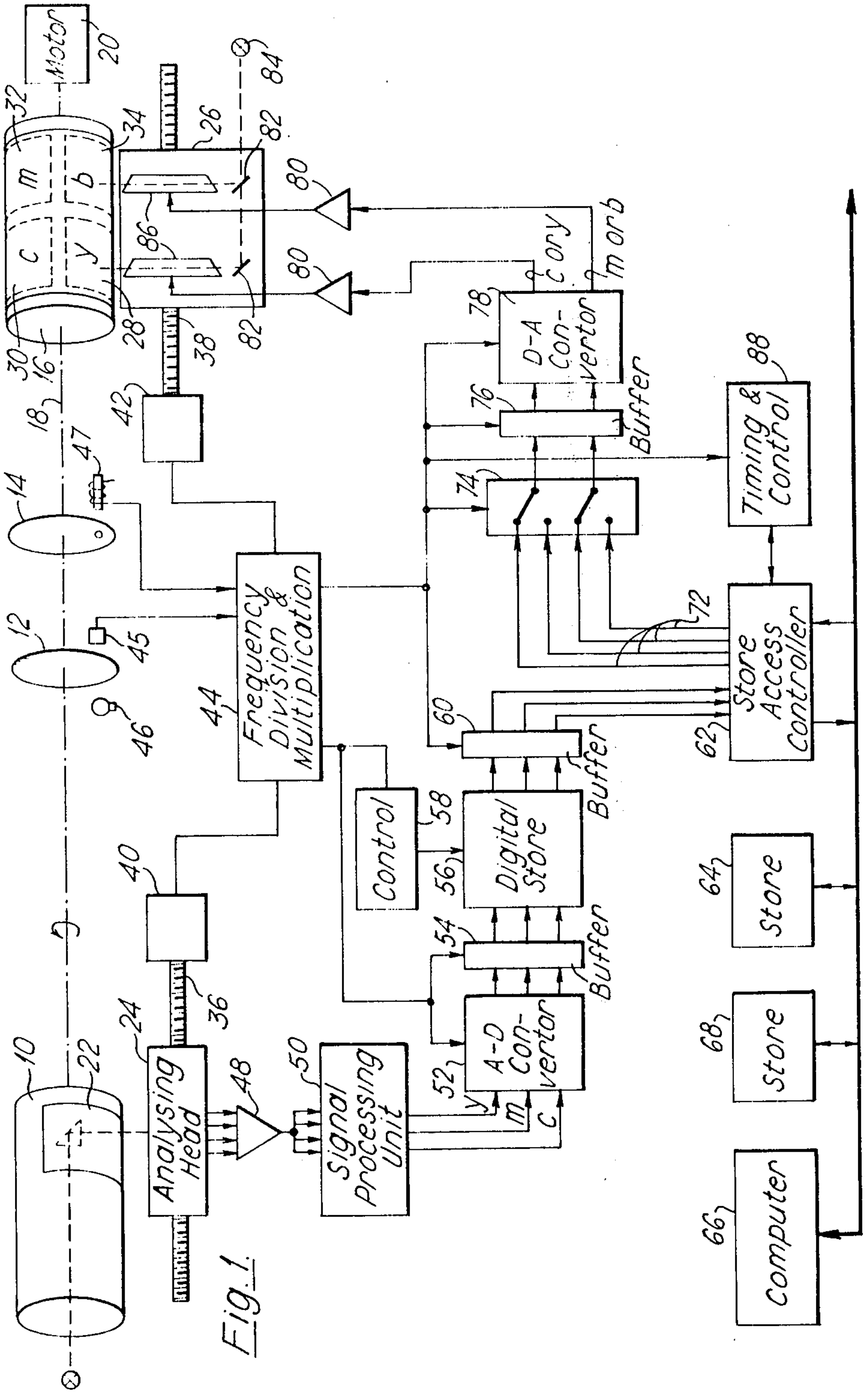

In one tecnique for reproducing coloured originals, the original to be reproduced is wrapped around the input drum of a colour scanner and its colour content is analysed, point by point, by photo-electric devices and colour filters. In this way, for each colour separation to be produced, a colour component electric signal is derived and this electric signal is used to control the exposure of a film which is to form a colour separation for that colour component. The film is wrapped around an output drum rotating at the same speed as the input drum; the output drum may be an axial extension of the input drum. The film is exposed point-by-point to the colour component electric signal, the point-by-point analysis and exposure being effected by rotating the drum or drums and simultaneously causing slow relative axial movement between the drums and the analysing and exposing heads. Generally, four separations are required from an original, these being the separations intended to control the printing of yellow, magenta, cyan and black ink. In some cases the black separation is omitted. It is customary to modify the electric signals before application to the exposure head to achieve colour correction, under colour removal, tone correction and so on.

It is a disadvantage of scanners of the kind described that the four separations must be made in sequence, which takes a considerable time. To overcome this disadvantage, in some known scanners four output cylinders or drums are provided, spaced along a common shaft. The four colour component signals are derived simulateneously from the analysing scanner and after correction are applied selectively to four separate recording heads. This method provides high productivity but at the expense of considerably lengthening the machine, especially when it is designed to handle separations of large size.

According to the present invention, the original to be reproduced is scanned to provide signals representing the colour component densities of successively scanned points of the original; at least two films to be exposed or other output surfaces to be treated by a reproducing means to form colour separations are circumferentially spaced around an output cylinder so they they occupy different arcs of the same circumferential track of the output cylinder; in a single revolution of relative rotation between the output cylinder and the reproducing means two or more colour separation control signals, derived by means of the said colour component signals, are applied in turn to the reproducing means to control the said exposure or other treatment in such a manner that a line of each of the films or other output surfaces is exposed or treated in the said single revolution, the relative rotation being continued until all lines have been exposed or treated.

Thus in one method of carrying the invention into effect four films, which are to be exposed to form the cyan, magneta, yellow and black separations, are angularly spaced around a single circumferential track on the second drum. Colour-component signals derived from the analysing head are stored and are extracted from store and applied to the reproducing head in turn, as required to expose lines of the films spaced around the second drum surface.

However, in our preferred form of apparatus for carrying the invention into effect, we space two films around a first circumferential track of the second drum and another two films around a second circumferential track, axially spaced from the first track. We expose the films on these two tracks by means of two reproducing heads. The advantage of such an arrangement is that in case of need a single large reproduction can be obtained by scanning as a single area a film occupying the whole of the space of the four small areas. The dimensions of such a film may thus be twice those of the smaller separations in each direction.

In an alternative form, a "mask" may be placed around the second drum surface, either in place of the black separation film, when no black separation is required, or on a further circumferential track. The mask may be of the type known as a knock-out mask, used to control the blanking out of parts of the picture area, or of the type known as in inset lettering mask, for inserting lettering or other devices of arbitrary colour into the picture area. In some cases it may be desirable to use more than one mask; for example, a first mask of standard form might be used for the printing of the cover of all issues of a journal and a second mask might vary from issue to issue, the two masks being wrapped in succession round the circumferential track of the output or input drum.

Instead of using a number of separate films to be exposed, each wrapped around an arc of the output drum, a single length of film may be wrapped around the drum, the different colour component separations being exposed on to successive circumferential areas of this film.

The rate of extraction of the digital signals from the store, relative to the rate of rotation of the drum and of axial movement of the drum with respect to the exposing head, can be used to control the degree of enlargement or reduction of the size of the reproduced image. An enlarging scanner based on the concept of digitally stored signals is disclosed in U.S. Pat. No. 3,541,245 to W. P. L. Willy and the present invention can advantageously be applied to such a scanner.

Figure 2:
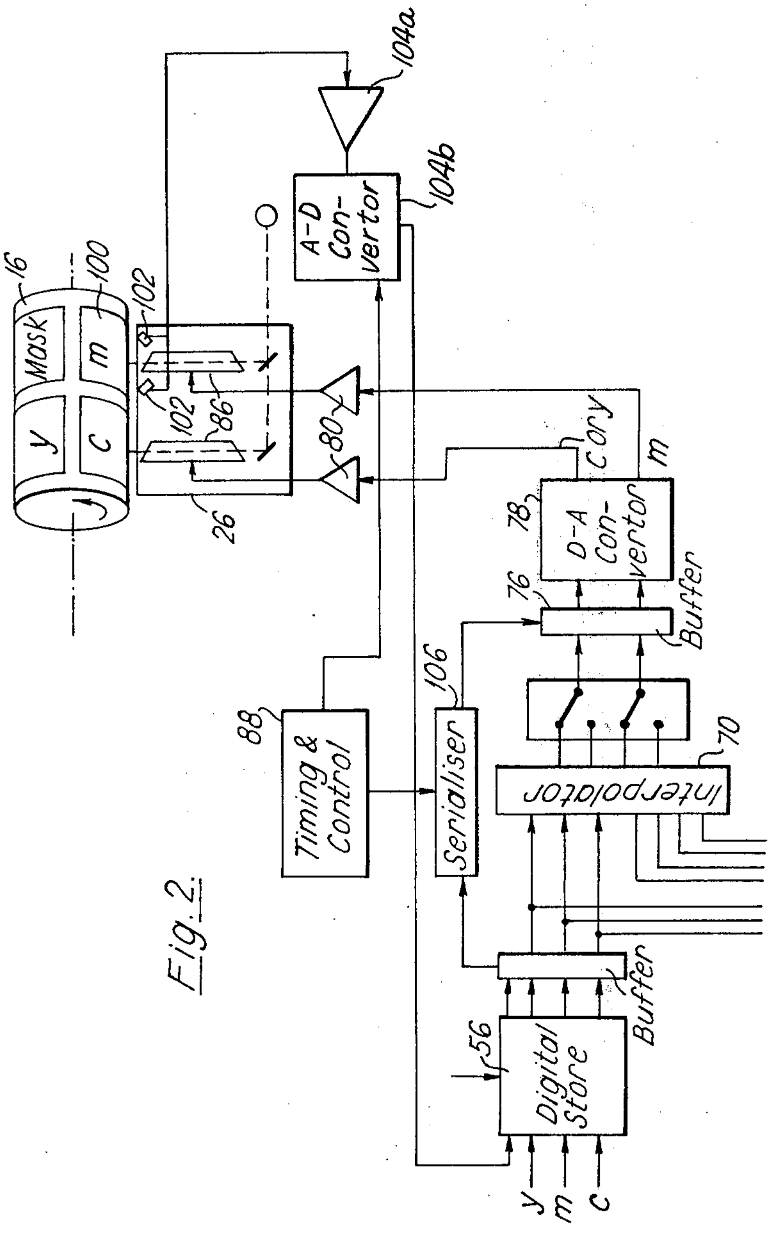
Figure 3:
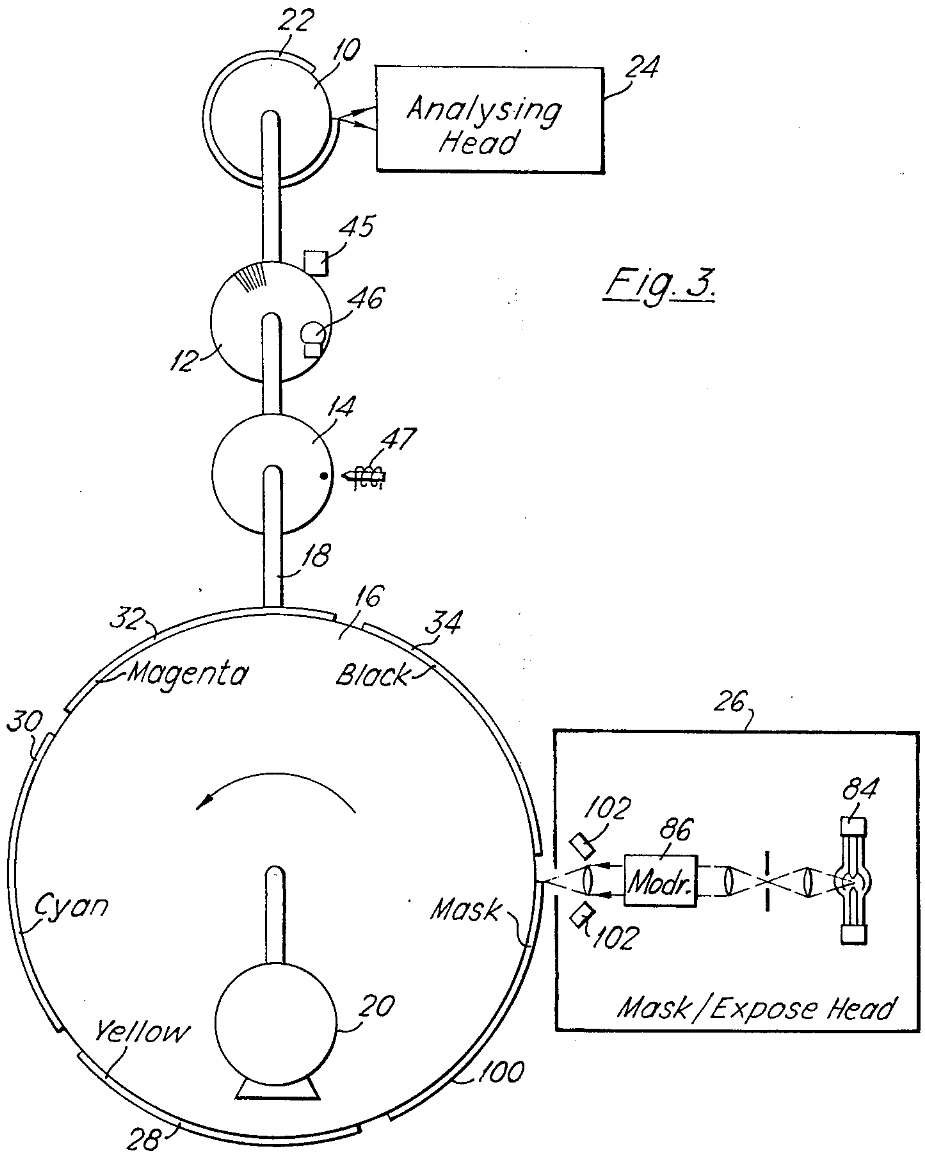

In order that the invention may be better understood, one example of apparatus embodying the invention will now be described with reference to the accompanying drawings, in which:

FIG. 1 is a block diagram of a preferred form of apparatus embodying the invention;

FIG. 2 indicates a modification to the block diagram of FIG. 1, when a mask is mounted on the reproducing drum in place of the black separation film; and FIG. 3 shows the general arrangement of a second form of apparatus embodying the invention.

in FIG. 1, an input drum 10, a radial grating 12, a "start" disc 14 and an output drum 16 are mounted on a common shaft 18 driven by a motor 20. The input drum 10 carries an original 22 which is scanned by an input scanning head 24. The head 24 derives colour component signals representing the coloured components of successively scanned elements of the coloured original. Corrected colour signals derived from the said colour-component signals are used in an exposing unit 26 to expose a yellow separation 28, a cyan separation 30, a magenta separation 32 and a black separation 34.

To cause the analysing and reproducing heads to scan their drums in a succession of parallel lines, the analysing head 24 is mounted on a lead screw 36 and the reproducing head 26 is mounted on a lead screw 38. These two lead screws are driven respectively by motors 40 and 42, their speeds being governed by a control unit 44 which is itself controlled by pulses from a photo-electric cell 45 located behind the radial grating 12, which is illuminated by a light source 46. Thus the amount of axial movement of the two heads is controlled by the extent of rotation of the drums. A magnetic pick-off 47 is energised by a piece of magnetic material inserted in the otherwise non-magnetic disc 14 to generate a single pulse in each revolution to enable the start of the revolution to be identified.

The analysing head 24 provides the three colour-component signals which then pass through amplifiers 48.

The yellow-channel, magenta-channel and cyan-channel signals are then converted to digital form in an analogue-to-digital converter 52 and are transferred through a buffer circuit 54 to a digital store 56. The rate of insertion into the store is set by frequency division and multiplication circuits in the unit 44 and this rate relative to the rate of rotation of the drum and of axial movement of the drum with respect to the exposing head and to the rate of extraction from the store controls the degree of enlargement or reduction of the size of the reproduced image. The manner in which this is achieved is more fully described in the above mentioned U.S. Pat. No. 3,541,245.

In the apparatus which is being described, colour correction is carried out with the aid of a store 64, which stores signal values corresponding to the desired renderings of a large number of colour points, appropriate colour points being extracted as required during scanning. This method is more fully described in my copending application Ser. No. 321,118 now abandoned. For the preliminary loading of the store 64, parameter values chosen in accordance with the requirements of an image to be scanned are set into a smaller store 68 and a computer 66 is employed to obtain a matrix of output values corresponding to given input values, using the selected parameter values; corresponding output and input values for the matrix are then stored in the digital store 64, the input values being used as store addresses and the output values as data. When scanning commences, the store 64 is addressed by the yellow, magenta, and cyan signals from the enlarging digital store 56, through a buffer circuit 60 and a store access controller 62.

In this example the store 64 provides four output signals for each set of three input signals, defining a colour point, the fourth output signal being a black printer.

Because the output drum has two scanning heads for simultaneously scanning two image areas and each head scans two separations in a single revolution, a selector switching unit 74 is interposed between the interpolator and a buffer 76. The switching unit 74 includes electronic switches operating in synchronism with the rotation of the drum 16, twice in each revolution of the drum. The two signals from the switching unit pass through a buffer 76 to two digital-to-analogue converters 78 and the resulting analogue signals are applied through modulator driver amplifiers 80 to the reproducing device 26.

The device 26 includes reflectors 82 for reflecting light from a source 84 to electro-optic modulators 86. Thus the light exposing the scanned separations is modulated in accordance with the colour-component signal values, the left-hand reproducing head exposing a line of the cyan separation while the right-hand head exposes a line of the magenta separation, after which the left-hand and right-hand heads expose a line of the yellow and black printer separations respectively. Scanning continues until the whole of each separation image area has been exposed.

The operation of the various circuits is synchronised by a timing and control unit 88, in turn controlled by the frequency-division and multiplication circuits in the control unit 44.

In the modification illustrated in FIG. 2, the black separation film on the drum 16 has been replaced by a mask 100 and the right-hand head of the reproducing device 26 is used alternatly as an exposing head and a mask-analysing head. For this purpose, it includes photo-electric devies 102 which provide signals which pass through a mask amplifier 104*a* to an analog digital converter; circuit 104*b*. The digital output of the circuit 104*b* for a scanned line of the mask is then transferred into the store 56. The resolution of the mask information along a scanning line may advantageously be greater than that of the picture information, especially when the mask includes lettering of small size; the circuit 104*b* may include packing circuits of known kind to permit the increased signal density to be accommodated. The mask information is extracted from the store 56 immediately and is applied through the serialiser 106 to the buffer 76, to modify the signals being applied to the left-hand modulator head of the device 26. After a half revolution of the drum, the masking signals for the same line are again extracted from store 56 and are used to modify the cyan and magenta channel signals which are applied to both modulators 86. The masking circuits control the substitution of an arbitrary level for a picture signal level. Control circuits (not shown) are included to turn the right-hand electro-optic modulator fully on during the time the mask in passing the head to provide illumination of the mask.

In an alternative arrangement, the mask is on a separate circumferential track of the drum 16, thereby permitting the masking of four colour printers during their exposure.

In an alternative form of apparatus shown in FIG. 3, the general arrangement of the drums on the shaft 18 is the same as in FIG. 1 but in FIG. 3 the output drum 16 carries the four colour separations 28, 30, 32 and 34 (the black printer), together with a mask 100, all circumferentially spaced around a single peripheral track of the drum. The reproducing device 26 carries a single head which, as in the case of FIG. 2, serves both as an exposing head, for four fifths of a revolution of the drum, and as a mask-analysing head for the remaining one-fifth of a revolution. The modulator 86 may be a Pockell cell and polarisors. It may be advantageous with such an arrangement to use two stores for the colour-signal information, an odd-line store and an even-line store, the stores being loaded alternately. Then during one revolution the analysing head 24 loads the odd-line store (for example) while the even-line store is unloaded to provide information for the reproducing devide 26, and vice versa. However, for the first fifth of the revolution, the head 26 acts as a mask-analysing head, the photo-cells 102 providing the masked signals which are used as required in the remainder of the revolution to substitute arbitrary signal levels for the picture signals.

In some cases, it may be convenient to put the mask 100 on to the input drum.

The separations produced by the apparatus described above are exposed films; however, they could take other forms, for example surfaces engraved with an electron beam, with a laser, or mechanically.

Although in the example described the colour-component signals are derived by scanning an original wrapped around an input cylinder, it will be understotod that other methods of scanning can be used to derive the colour-component signals. For example, the scanning light spot could be generated by a cathode ray tube, the spot tracing a raster on the tube face and the original to be scanned remaining stationary.

In addition, it might in some cases be desirable to store the colour-component signals on a record medium before using them to expose the separations on the output cylinder. Thus in this case, input scanning and reproduction do not occur simultaneously.

I claim:

1. A method of preparing colour component separations to make a reproduction of a coloured original comprising the steps of:

scanning the original to derive analogue signals representing the colour component densities of successively scanned points of the original;

converting the said analogue colour-component signals into digital signals;

storing the digital colour-component signals representing the colour-component densities of a line of the original in a store having a capacity less than that required for the storage of colour-component data for the whole of the coloured original;

circumferentially spacing around an output cylinder at least two output surfaces to be treated by a reproducing means to form colour separations, so that they occupy different arcs of the same circumferential track of the output cylinder;

relatively rotating the said output cylinder and the reproducing means so that each output surface in turn is presented to the reproducing means in the course of a single revolution of the said relative rotation and relatively axially displacing the output cylinder and reproducing means to enable the reproducing means to scan the output surfaces in a succession of parallel circumferential lines;

extracting from the store, in a first part of the period of a revolution of the said relative rotation, signals corresponding to the densities in a first colour component of the picture elements in the corresponding scanned line of the original;

controlling the treatment of a line of a first output surface presented to the reproducing means in the said first part of the revolution in accordance with the colour component signals extracted from the store;

extracting from the store, in a second part of the said period of a revolution of the said relative rotation, signals corresponding to the densities in a second colour component of said picture elements in said scanned line of the original;

controlling the treatment of a line of a second output surface presented to the reproducing means in the second part of the said revolution in accordance with the colour component signals extracted from the store in said second part, a line of each of said output surfaces being treated in the period of a single revolution;

erasing from the store said signals used in the control of the treated line of the output surfaces and replacing those signals by colour component signals relating to a subsequently scanned portion of the coloured original, the storing of signals, the relative rotation and relative axial displacement and the erasing of signals from the store being continued until the whole of the coloured original has been scanned and all lines of the output surfaces have been treated;

preparing printing surfaces from the said output surfaces spaced around the output cylinder;

and printing superimposed and registering impressions on a receiving member with the prepared printing surfaces, one after another.

2. A method in accordance with claim 1, including mounting a mask on a circumferential track of the output cylinder, scanning the mask by means of an analysing head during the said relative rotation of the output cylinder and the head, storing signals from the mask-analysing head, and subsequently extracting the said signals from store to modify colour-component signals, and modulating to said reproducing means with the said modified signals as required by the mask.

3. Image-reproduction apparatus for prepariing colour-component separations to make a reproduction of a coloured original comprising:

an image-analyzing device including means for scanning an original to be reproduced to derive electric signals representing the colour-component densities of successively scanned points of the original;

signal-processing means utilizing the colour-component signals to derive further signals constituting colour-separation control signals to control the treatment of colour-separation output surfaces;

an analogue-to-digital converter for converting analogue colour-component signals derived from the said scanner into digital signals;

a digital store having a capacity less than that required for the storage of colour-component data for the whole of the coloured original, connected to receive from said analogue-to-digital converter digital signals corresponding to the colour component densities of a scanned line of the original to be reproduced;

a reproducing device including an output cylinder for receiving on different arcs of the same circumferential track of the cyclinder at least two output surfaces to be treated and a reproducing head for treating said output surfaces to form said colour separations;

means for relatively rotating said output cylinder and said reproducing head so that each output surface on the said track is presented in turn to said reproducing head in the course of a single revolution of said relative rotation;

means for relatively axially displacing said output cylinder and said reproducing head, whereby said reproducing head scans said output surfaces during said relative rotation in helical fashion;

means for extracting from the store colour separation control signals and for applying said signals to the reproducing head;

the extracting means including switching means for deriving signals representing the densities in a selected colour component of the elements in the scanned line of the original; and synchronising means controlling the switching means in accordance with the said relative rotation to extract signals corresponding to a first colour component of the elements in the scanned line in a first part of the revolution, and signals corresponding to a second colour component of said elements during a second part of the revolution, whereby during a single revolution of realtive rotation colour separation control signals for treating one line of each of the said output surfaces on the output cylinder are extracted and are erased from the store, whereby said store can be used for colour component signals relating to a subsequently scanned portion of the coloured original.

4. Apparatus as defined in claim 3, in which the reproducing head also serves as an analysing head and includes photo-electric devices for producing electric signals corresponding to density values of scanned points, whereby a mask on the output cylinder can be scanned to obtain masking signals from the photo-electric devices, means for storing the masking signals during at least a part of the relative rotation of the cylinder and reproducing head, and means for switching the said from its reproducing function to its analysing function and vice versa in synchronism with the rotation of the said output cylinder.

* * * * *